United States Patent [19]
Wolff et al.

[11] Patent Number: 6,075,771
[45] Date of Patent: Jun. 13, 2000

[54] FAIR ALLOCATION OF EXCESS RESOURCES IN A COMMUNICATIONS SYSTEM

[75] Inventors: Mark Wolff, Ottawa; Wayne Wall, Kanata, both of Canada

[73] Assignee: Newbridge Networks Corporation, Kanata, Canada

[21] Appl. No.: 08/849,450

[22] PCT Filed: Dec. 13, 1995

[86] PCT No.: PCT/CA95/00705

§ 371 Date: Oct. 27, 1997

§ 102(e) Date: Oct. 27, 1997

[87] PCT Pub. No.: WO96/19060

PCT Pub. Date: Jun. 20, 1996

[30] Foreign Application Priority Data

Dec. 14, 1994 [CA] Canada ............................. 213806163

[51] Int. Cl.$^7$ .................................................. H04L 12/56
[52] U.S. Cl. .......................... 370/232; 370/412; 370/468
[58] Field of Search .......................... 370/230, 232–236, 370/252, 253, 395, 397, 468, 412–417, 229–235

[56] References Cited

U.S. PATENT DOCUMENTS

| | | | |
|---|---|---|---|
| 4,769,810 | 9/1988 | Eckberg, Jr. et al. | 370/232 |
| 5,335,224 | 8/1994 | Cole et al. | 370/235 |
| 5,412,647 | 5/1995 | Giroux et al. | 370/232 |
| 5,426,635 | 6/1995 | Mitra et al. | 370/229 |
| 5,446,733 | 8/1995 | Tsuruoka | 370/232 |
| 5,568,476 | 10/1996 | Sherer et al. | 370/236 |
| 5,781,532 | 7/1998 | Watt | 370/236 |

*Primary Examiner*—Chau Nguyen
*Assistant Examiner*—Frederic D. Wilkow
*Attorney, Agent, or Firm*—Marks & Clerk

[57] ABSTRACT

In a communications system, a method is described for controlling the excess usage of a finite resource through which information flows by a plurality of sources having an "excess" state. For each source a determination is made as to whether the source is in the excess state. If the excess information rate is less than a predetermined fair information rate, the information is passed to the resource. If the excess information rate is greater than the fair information rate, the information is discarded.

7 Claims, 3 Drawing Sheets

FAIR ALLOCATION OF EXCESS RESOURCES IN A COMMUNICATIONS SYSTEM

BACKGROUND OF THE INVENTION

This invention relates to a method of fairly controlling the excess usage of a finite resource, for example the usage of available bandwidth by permanent virtual circuits in frame relay networks.

In frame relay networks, permanent virtual circuits are set up through the network and frames are routed at each node in accordance with a virtual circuit id carried in the packet header. Available bandwidth is of course determined by the physical links and as a result congestion can occur in the network. When this happens frame relay may discard packets, which then must be retransmitted.

Existing frame relay networks (based upon current frame relay standards) have a problem with regards to the way in which spare/free bandwidth is allocated. Virtual circuits competing for excess bandwidth are not subject to fairness. Frames received by the switching mechanism are switched out to an outgoing transmit queue. If the transmit queue is congested (i.e. virtual circuits on that piece of bandwidth are transmitting more than the resource can handle) then the number of frames in the transmit queue will increase, potentially eventually overflowing. Essentially, the virtual circuit transmitting the most frames will get to consume the most bandwidth and the most transmit and buffering resources.

Current technologies, for example, as illustrated in the paper by D. B. Grossman entitled "An Overview of Frame Relay communications", CONFERENCE ON COMPUTERS AND COMMUNICATIONS, March 1991, and the paper by K. S. R. Mohan "Enterprise Networking using Frame Relay", PACIFIC TELECOMMUNICATIONS CONFERENCE, vol. 1, January 1993, in this area rely upon the Committed Information Rate and congestion procedures defined in the ANSI specifications. These procedures allow the user devices in a network to be policed to a committed information Rate (CIR), but burst up to an excess information rate (EIR). Excess burst traffic is marked as excess in frame relay by setting a DE (discard eligible) bit. DE frames are discarded in preference to non DE frames.

Other situations arise where the 'excess' usage of any resource by competing users needs to be controlled.

An object of the invention is to provide a method of fairly controlling the excess usage of a finite resource.

SUMMARY OF THE INVENTION

According to the present invention there is provided a method of controlling, in a digital communications system, flow of traffic into a resource having a shared input queue of finite capacity, and further having a flow of traffic which originates from a plurality of information sources, and wherein a committed information rate is pre-established for each source and the traffic from each source carries an excess indication when it is flowing at a rate in excess of said committed information rate, the method comprising, for each source, carrying out steps of at call set up, defining a fair burst Bf representing a number of bits that may be transferred from the source within a predetermined time interval T such that the sum of the fair bursts Bf for all sources does not exceed resource queue size, and a fair information rate Bf/ΔT, and ΔT is a time interval over which a burst rate is measured; determining whether traffic from said source carries an excess indication; determining whether the resource is experiencing congestion; if step b determined that the traffic carried an excess indication and step c determined that the resource in congested, subsequently measuring a current information rate of traffic carrying an excess indication and determining if said current rate of incoming traffic is greater than the fair information rate; and of the current information is greater than said fair information rate, discarding the incoming traffic.

In a preferred embodiment, the method of controlling the "fair" excess information rate is based upon the "leaky bucket" approach, although other bandwidth admissions procedures can be employed. This makes the allocation of excess resources 'fair' between competing virtual circuits. A definition of fair information rate will be given later in the specification. For example, in the case of a frame relay network, each virtual circuit runs its own instance of the described procedure.

BRIEF DESCRIPTION OF THE DRAWINGS

The invention will now be described in more detail, by way of example only, with reference to the accompanying drawings, in which:

Referring now to FIG. 1, this shows an approach to the problem of fair resource allocation in a frame relay network.

DETAILED DESCRIPTION OF THE INVENTION

Figure 1:
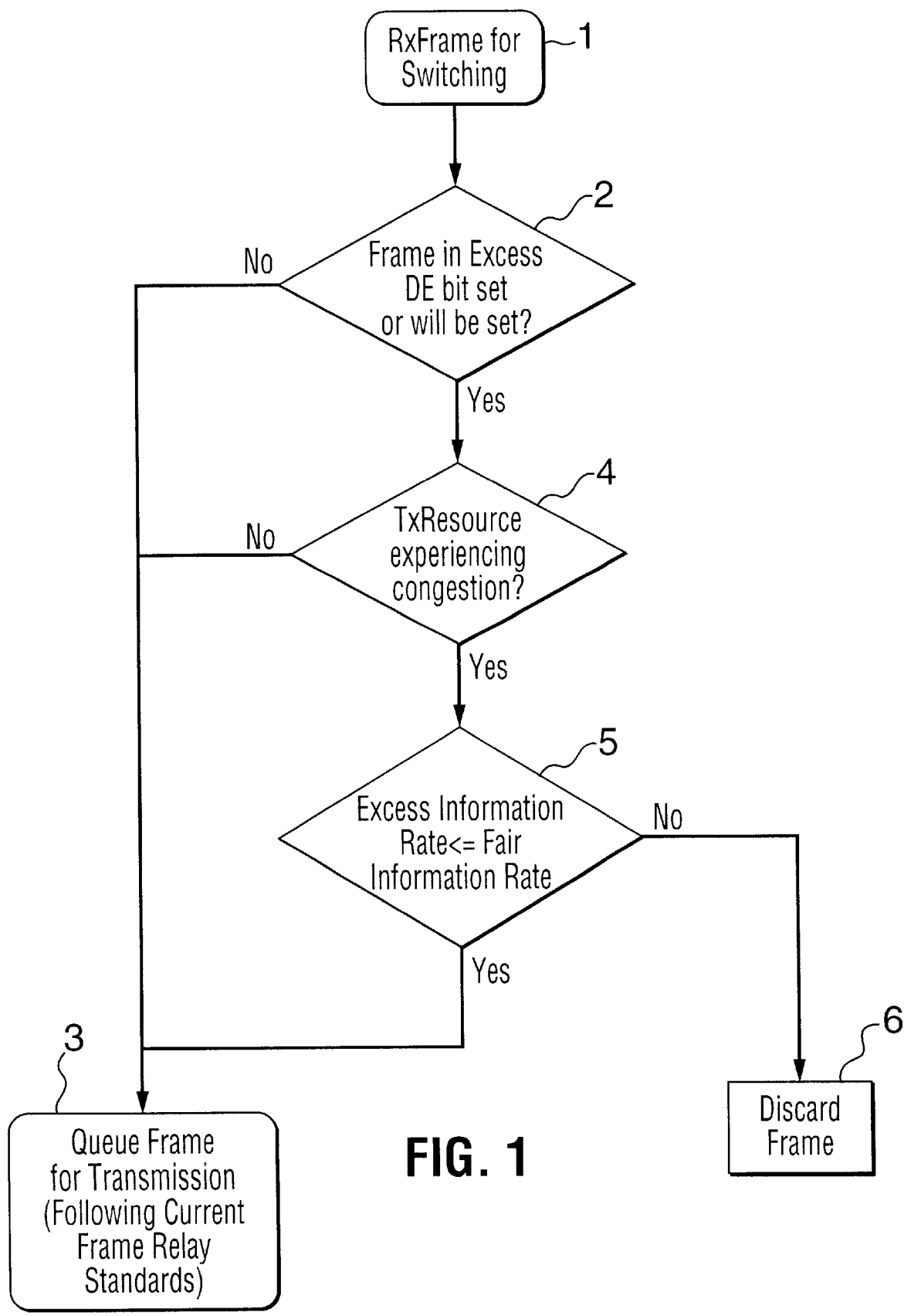
FIG. 1 is a flow chart illustrating the method in accordance with the invention.

In FIG. 1, an incoming frame Rx 1 in a frame relay network is passed to decision unit 2, which determines whether the frame is in an excess condition indicated either by the DE bit being set, or by conventional frame relay information rate procedures setting the DE bit. If the frame is not in excess, it is passed to frame queue 3 for transmission over the permanent virtual channel using current frame relay standards in a conventional manner. If the answer is yes, the frame is passed to decision unit 4, which determines whether the transmission resource is experiencing congestion. If no congestion is being experienced, the frame is passed to output queue 3; if congestion is being experienced the frame is passed to decision unit 5. This determines whether the current excess information rate is less than the Fair information rate, of the frame FairIR. If the answer is yes, the frame passed to output queue 3; if no the frame is passed to discard unit 6.

A Fair Burst (Bf) is defined as the number of bits in the outgoing resource (queue) that may be consumed by a virtual circuit within a time interval T. This value is negotiated on a per virtual circuit basis at call set-up time. The sum of the Bf for all the permanent virtual channels on the that resource cannot normally be more than the total size of the resource. (e.g. Sum of all Bf <=txQueue size in bits)

The FairIR (Fair Information rate), which is the information rate allowed to 'leak' into the congested resource, is defined as Bf/ΔT, where ΔT is the Time period over which the rate is measured. ΔT is implementation dependent and usually small.

The measurement of the onset of congestion or the level of resource congestion is implementation dependent. For example, this can be achieved by monitoring the utilization of a resource and raising a congestion alarm if the utilization exceeds a predetermined threshold.

Figure 2:
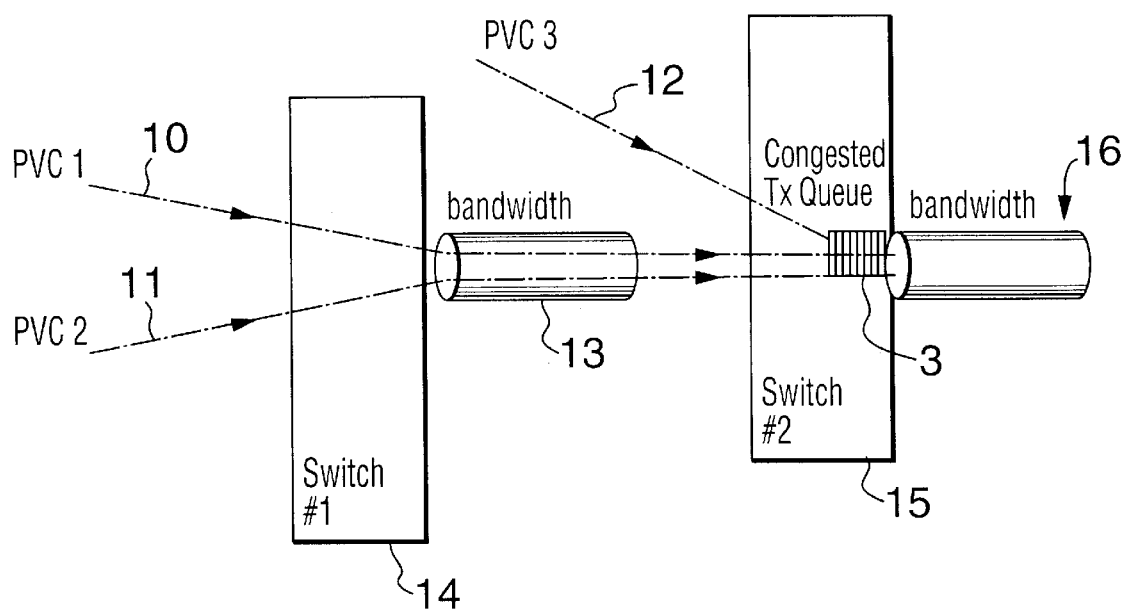
FIG. 2 is a diagram illustrating an application of the method.

FIG. 2 shows a specific embodiment of the invention comprising switches 14, 15 and physical links 13, 16. Virtual circuits 10, 11, 12 compete for available bandwidth in outbound physical link 16 from switch 15. Frames being switched onto physical link 16 are passed to transmit queue 3 for transmission on outbound physical link 16, which in accordance with the invention can be guaranteed to transmit some DE frames (the amount can be commissioned at call set-up based upon the PVCs Bf value) while the congested bandwidth resource is congested.

In the FIG. 2, virtual channels are multiplexed onto a single physical link 16 having a predetermined bandwidth. Because of the nature of frame relay, PVC 10, PVC 11, and PVC 12 can send more data than the physical link 16 can handle.

In switch 15 the Tx bandwidth pipe 16 is assumed to be congested because PVC 10, PVC 11, and PVC 12 are competing for finite bandwidth resources that are near depletion. In a traditional frame relay network, all three PVCs could burst beyond the negotiated Bc (burst capacity) arid have their DE bits set on all excess frames. The PVC sending the most frames would get preference and could 'starve' the other PVCs from getting any DE frames through. Traditional networks are usually based upon a first come, first served model.

By applying the method described above frames received on PVC 10, PVC 11 and PVC 12 at Switch 15, all three permanent virtual channels can send DE frames on the congested resource, based upon Bf value for each PVC.

Figure 3:
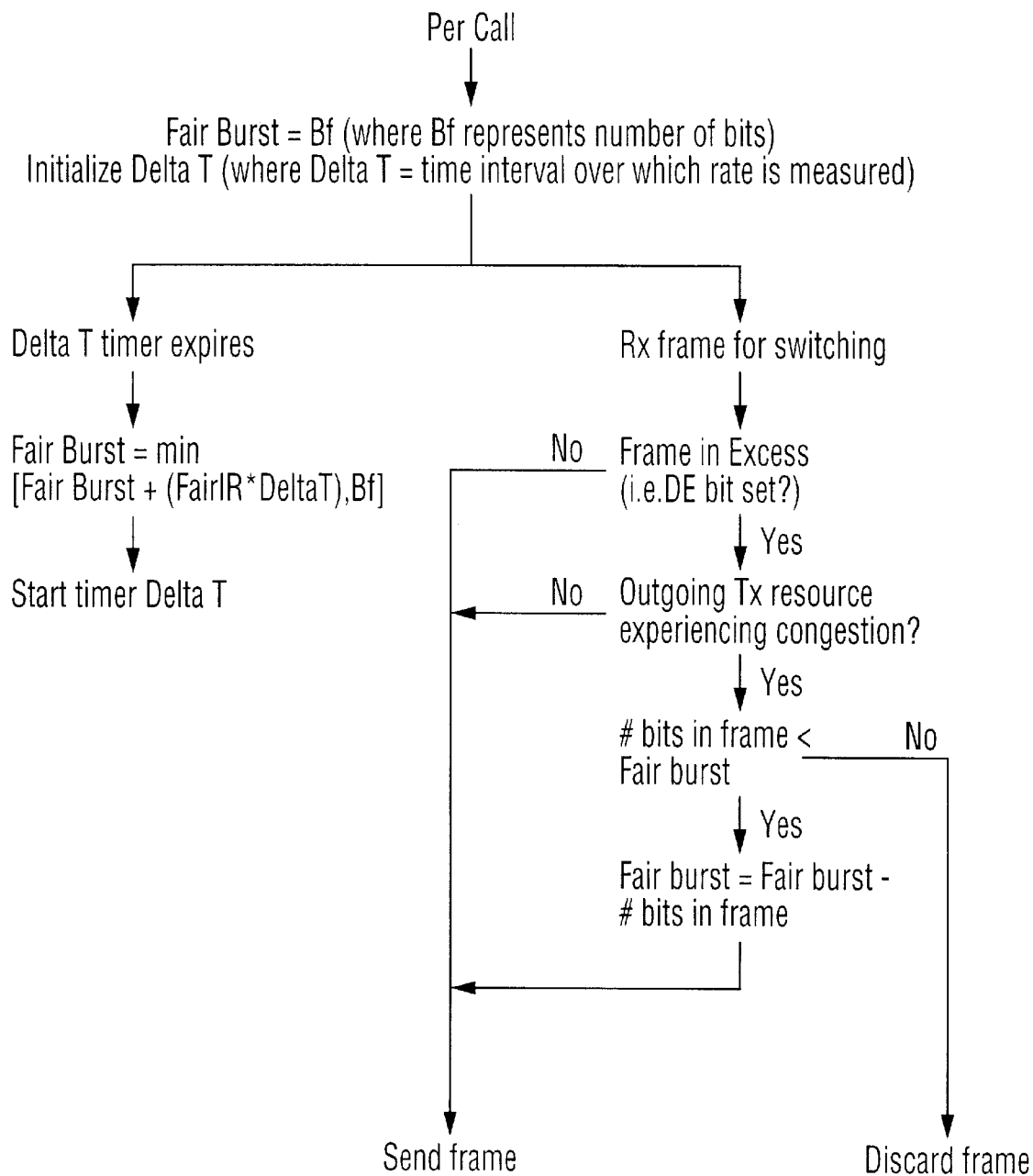
FIG. 3 illustrates a "leaky bucket" implementation of the invention.

FIG. 3 shows a "leaky bucket" implementation of the invention, which makes use of a sliding window approach and is carried out on a per call basis. First, on call set up, the Fair Burst is set to Bf, which is dependent on systems resources, $\Delta T$ is initialized, and a timer is started. When the $\Delta T$ timer expires, the fair burst is set to the [Fair Burst+ (FairIR*$\Delta T$)] or Bf, whichever is less and the $\Delta T$ timer restarted.

Simultaneously, the received frames are monitored to determine whether the DE bit is set, i.e. the frame is in excess. If not, the frame is passed to the transmit queue. If yes, the circuit determines whether the transmit resource is congested. If not, the frame is passed to the transmit queue. If yes, the circuit then determines whether the number of bits in the frame is less than the current fair burst. If the answer is no, the frame is discarded.

If yes the current fair burst is set to the old fair burst— number of bits in the frame and the frame passed to the transmit queue.

The circuit thus operates on the credit principle. Each time the timer is re-initialized, the "credit" fair burst rate for the channel is reset. This credit is then gradually used up as excess frames are transmitted until the timer expires, when the cycle repeats.

The invention thus allows PVCs 10, 11, 12 to have fair access to the physical link 16.

We claim:

1. A method of controlling, in a digital communications system, flow of traffic into a resource having a shared input queue of finite capacity, and further having a flow of traffic which originates from a plurality of information sources, and wherein a committed information rate is pre-established for each source and the traffic from each source carries an excess indication when it is flowing at a rate in excess of said committed information rate, the method comprising, for each source, carrying out steps of:

a) at call set up, defining a fair burst Bf representing a number of bits that may be transferred from the source within a predetermined time interval T such that the sum of the fair bursts Bf for all sources does not exceed resource queue size, and a fair information rate Bf/$\Delta T$, and $\Delta T$ is a time interval over which a burst rate is measured;

b) determining whether traffic from said source carries an excess indication;

c) determining whether the resource is experiencing congestion;

d) if step b determined that the traffic carried an excess indication and step c determined that the resource is congested, subsequently measuring a current information rate of traffic carrying an excess indication and determining if said current rate of incoming traffic is greater than the fair information rate; and e) if the current information is greater than said fair information rate, discarding the incoming traffic.

2. A method as claimed in claim 1, wherein the digital communications system is a frame relay network, said resource comprises available bandwidth on an outbound physical link from a switch in said network.

3. A method as claimed in claim 2, wherein step b comprises determining whether a discard eligibility bit of a received frame is set.

4. A method as claimed in claim 2, wherein the non-discarded traffic is passed to a transmit queue in the resource.

5. A method of controlling, in a digital communications system, excess usage of a finite resource in the form of available bandwidth on an outbound link through which traffic flows by a plurality of information sources having a committed information rate and and wherein traffic in excess of said committed rate carries an excess indication, comprising, for each source, carrying out steps of:

a) defining a fair information rate as the number of bits (Bf) in an outgoing resource queue that can be consumed by a virtual circuit within a predetermined time interval divided by an incremental time period over which an information rate is measured, where the sum of the Bf for all channels is less than or equal to a number of bits in the transmit queue of the resource;

b) determining whether traffic from said source carries and excess indication;

c) determining whether the resource is experiencing congestion;

d) if step b determined that the traffic carried an excess indication and step c determined that the resource is congested subsequently measuring a current information rate of incoming traffic and determining whether the current information rate of incoming traffic carrying an excess indication is greater than the fair information rate; and e) if the current information rate is greater than said fair information rate, discarding the incoming traffic.

6. A method as claimed in claim 5, wherein upon set-up of a virtual circuit through said communications system, a predetermined fair burst value (Bf) is set and a timer started, and if both the result of the determination in steps b and c is positive and the number of bits in the frame is less than the fair burst value (Bf), the fair burst value Bf is reset to the old fair burst value less the number of bits in the frame, otherwise the frame is discarded.

7. A method as claimed in claim 6, wherein said digital communications system is a frame relay network.

* * * * *